(12) United States Patent
Jones

(10) Patent No.: US 8,997,690 B2
(45) Date of Patent: Apr. 7, 2015

(54) AUTOMATED ANIMAL CARE DEVICE

(71) Applicant: Paul Ernest Jones, Byers, CO (US)

(72) Inventor: Paul Ernest Jones, Byers, CO (US)

( * ) Notice: Subject to any disclaimer, the term of this patent is extended or adjusted under 35 U.S.C. 154(b) by 238 days.

(21) Appl. No.: 13/851,724

(22) Filed: Mar. 27, 2013

(65) Prior Publication Data

US 2014/0290584 A1    Oct. 2, 2014

(51) Int. Cl.
*A01K 7/02* (2006.01)
*A01K 5/01* (2006.01)
*A01K 5/02* (2006.01)
*A01K 7/04* (2006.01)

(52) U.S. Cl.
CPC ............... *A01K 7/02* (2013.01); *A01K 5/0114* (2013.01); *A01K 5/0291* (2013.01); *A01K 7/04* (2013.01)

(58) Field of Classification Search
USPC .............. 47/51.01, 51.5, 52.1, 56.1, 57, 57.1, 47/57.92, 61.5, 57.5; 222/129, 55, 56, 59, 222/64, 65, 67, 650
See application file for complete search history.

(56) References Cited

U.S. PATENT DOCUMENTS

| | | |
|---|---|---|
| 3,556,057 A | 1/1971 | Icking |
| 3,577,957 A | 5/1971 | Sandig |
| 3,625,183 A | 12/1971 | Tartar |
| 3,648,660 A | 3/1972 | Esquival |
| 3,653,360 A | 4/1972 | Foster |
| 3,698,361 A | 10/1972 | Lecce |
| 3,762,373 A | 10/1973 | Grossman |
| 4,051,812 A | 10/1977 | DeLoach et al. |
| 4,055,147 A | 10/1977 | Fletcher et al. |
| 4,181,097 A | 1/1980 | Betsuno |
| 4,256,054 A | 3/1981 | Hitchcock |
| 4,315,483 A | 2/1982 | Scheidler |
| 4,337,728 A | 7/1982 | Van Gilst et al. |
| 4,416,220 A | 11/1983 | Dougan |
| 4,422,409 A | 12/1983 | Walker et al. |
| 4,640,229 A | 2/1987 | Swartzendruber et al. |
| 4,688,520 A | 8/1987 | Parks |
| 4,782,790 A | 11/1988 | Batson |
| 4,989,547 A | 2/1991 | Eaton |
| 5,005,524 A | 4/1991 | Berry |
| 5,067,443 A | 11/1991 | Hurnik et al. |
| 5,230,300 A | 7/1993 | Mezhinsky |
| 5,265,560 A | 11/1993 | Dobbins |
| 5,299,529 A | 4/1994 | Ramirez |
| 5,363,805 A | 11/1994 | Wing |
| 5,372,093 A | 12/1994 | Pooshs |
| 5,398,643 A | 3/1995 | McElrath et al. |
| 5,433,171 A * | 7/1995 | Ewell ........................ 119/51.5 |
| 5,588,394 A | 12/1996 | Balistreri |
| 5,735,231 A | 4/1998 | Terenzi |
| 5,794,560 A | 8/1998 | Terenzi |

(Continued)

*Primary Examiner* — David Parsley
*Assistant Examiner* — Danielle Clerkley
(74) *Attorney, Agent, or Firm* — Craig W. Barber; The Law Office of Craig W. Barber

(57) ABSTRACT

An automated animal feeder may have a pair of traditional pet bowls, one for food and one for water, and the water bowl may be physically lifted and dumped on a timed schedule as the water bowl may be mounted upon a hinged plate which swings up to empty the water bowl at programmed intervals controlled by a programmed logic controller, and the water bowl may be refilled whenever the weight of the bowl is light enough to indicate that the bowl is not full. Food may be metered by means of a portion control hopper located beneath the food supply hopper. The programmed logic controller (PLC) allows the timing of feeding and watering to be controlled by the user.

5 Claims, 5 Drawing Sheets

(56) References Cited

U.S. PATENT DOCUMENTS

| | | |
|---|---|---|
| 6,044,797 A | 4/2000 | Leason et al. |
| 6,062,166 A | 5/2000 | Macrina |
| 6,367,417 B1 | 4/2002 | Gal et al. |
| 6,487,987 B1 | 12/2002 | Choi |
| 6,701,866 B1 | 3/2004 | Shieh |
| 7,152,550 B2 | 12/2006 | Walker |
| 7,438,020 B2 | 10/2008 | Palett et al. |
| 7,650,855 B2 | 1/2010 | Krishnamurthy |
| 7,905,200 B1 | 3/2011 | Gaston et al. |

* cited by examiner

| | | |
|---|---|---|
| SW1 OPEN | depressed | |
| SW1 CLOSED | relaxed | high signal |
| SW2 OPEN | depressed | high signal |
| SW2 CLOSED | relaxed | |
| SW4 OPEN | depressed | high signal |
| SW4 CLOSED | relaxed | |

| | SW 2 NO SIGNAL | SW2 HIGH SIGNAL |
|---|---|---|
| SW1 NO SIGNAL | - | - |
| SW1 HIGH SIGNAL | - | Activates Solenoid 1 |

AUTOMATED ANIMAL CARE DEVICE

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 CFR 1.71(d).

CROSS-REFERENCE TO RELATED APPLICATIONS

N/A

INVENTOR

Paul Ernest Jones

FIELD OF THE INVENTION

This invention relates generally to pet care devices, and specifically to automated food and water stations.

STATEMENT REGARDING FEDERALLY FUNDED RESEARCH

This invention was not made under contract with an agency of the US Government, nor by any agency of the US Government.

BACKGROUND OF THE INVENTION

Pet and animal owners are aware that feeding and providing water for pets during brief absences is always a concern. Placing pets into pet care facilities usually results in the pet coming home with a case of "kennel cough" or similar extremely contagious disease, leaving pets even with friends or family forces the pet into strange surroundings and so on.

It would be advantageous to leave a pet or animal in its normal living space, however, the problem of food and water still remains. In attempting to solve this problem a number of automated pet feeders have been proposed These devices provide a pet a means of receiving nourishment on a regular basis but have the extreme disadvantage that they either do not actually remove stale water or else require some plumbing to be done to provide some sort of flow through system. If they do provide clean water, it tends to be arranged in a large trough unfamiliar to the animal.

It would be advantageous to provide food and water on a regular automated basis, but to also allow the animal to use familiar feeding bowls, and at the same time to provide a means of cleaning out the familiar feeding bowls.

SUMMARY OF THE INVENTION

General Summary

The present invention teaches that an automated animal feeder may have a pair of traditional bowls, one for food and one for water, such as pets are already accustomed to eating from. The water bowl may be physically lifted and dumped so as to remove dirty water, debris, dead insects or the like, and this operation can be followed immediately by the provision of fresh water. The food bowl may be replenished as well.

The water bowl may be mounted upon a hinged plate which swings up to empty the water bowl at programmed intervals controlled by a programmed logic controller, and in addition the water bowl may be refilled whenever the weight of the bowl is light enough to indicate that the bowl is not full.

The food supply may be metered by means of a portion control hopper located beneath the food supply hopper.

By means of the programmed logic controller (PLC) the timing of feeding and watering may be controlled by the user.

Summary in Reference to Claims

It is therefore another aspect, advantage, objective and embodiment of the invention, in addition to those discussed previously, to provide a pet care device comprising:

a cabinet and disposed below the cabinet a base, the cabinet and the base having a gap therebetween, the base having a flat upper surface comprising a hinge plate and a fixed plate;

a water bowl disposed upon and attached to the upper surface hinge plate portion by a plurality of spring loaded pins which urge the water bowl upward when the water bowl is empty;

the hinge plate having at least one hinge attached to a first edge of the hinge plate, the hinge also attached to the base, the hinge plate being rotatable upon the hinge from a first position in which the water bowl rests upright upon the base to a second position in which the bowl is substantially perpendicular to the first position, the hinge plate having on the upper surface a first switch (N-C) disposed so that when the water bowl is empty, the switch is in a first position, but when the water bowl is not empty the switch is in a second position, the base having a second switch (N-O) disposed so that when the hinged plate is in the first position the switch is in a first position, but when the hinged plate is not in the first position, the switch is in a second position, the base having within itself an electrical motor, the electrical motor driving a threaded axle worm drive, the threaded axle worm drive having riding thereupon and in threaded mechanical engagement thereto a worm gear, the worm gear attached to an arm at a first end of the arm, the arm attached to the hinge plate, the worm gear having a first position upon the worm drive in which the arm is in a first position, whereby the hinged plate rests in the hinged plate's first position and the water bowl rests upright upon the base when the worm gear is in the worm gear's first position, the worm gear having a second position upon the worm drive in which the arm is in a second position, whereby the hinged plate is in the hinged plate's second position when the worm gear is in the worm gear's second position;

a third switch (polarity) which has a first mode in which a current may pass through the switch in a first direction and having a second mode in which the current may pass through the switch in a second direction, the third switch being disposed in a position such that when the worm gear reaches the second position upon the worm drive, the worm gear activates the third switch to change mode, the current from the third switch passing through the electrical motor, whereby when the third switch changes polarity, the electrical motor changes a direction of rotation, whereby the worm gear changes a direction of motion upon the worm drive;

a food dish attached to the fixed plate of the flat upper surface of the base;

a food supply container having a sloping bottom having a food supply aperture therethrough, the food supply aperture having a food supply spring loaded door with open and closed positions, the spring loaded food supply door having a spring which urges the spring loaded food supply door into the closed position, a first solenoid operatively mechanically attached to the spring loaded food supply door to move it to the open position, a portion hopper disposed immediately beneath the food supply aperture and having a first condition characterized by being full of food so that such spring loaded food supply door is blocked; whereby when the first solenoid opens the spring loaded food supply door, food within the food supply container may fall into the portion hopper only until the portion hopper is full;

the portion hopper also having a sloped bottom, the sloped bottom having a portion hopper aperture therethrough; the portion hopper aperture having a portion hopper spring loaded door with open and closed positions, the portion hopper spring loaded door having a spring which urges the portion hopper spring loaded door into the closed position, a second solenoid operatively mechanically attached to the portion hopper spring loaded door to move it to the open position, a food supply conduit with an upper end disposed beneath the portion hopper aperture and a lower end disposed directly above the food bowl and operative to convey food from the food supply aperture to the food bowl, a water supply container having water therein, the water supply container being attached to a water supply, the water supply container having a float and plug attached to a water supply arm at a first end of the water supply arm, the water supply arm having a second solenoid attached to a second end of the water supply arm, the water supply arm having a first position in which the plug blocks a water supply aperture and a second position in which the plug does not block the water supply aperture, the float operative to maintain the arm in the second position and the plug not blocking the water supply aperture only while a first quantity of water remains within the water supply container, a water supply conduit with an upper end disposed beneath the water supply aperture and a lower end disposed directly above the water bowl and operative to convey water from the water supply aperture to the water bowl.

It is therefore another aspect, advantage, objective and embodiment of the invention, in addition to those discussed previously, to provide an animal care device comprising:

a cabinet and a base disposed below the cabinet, the cabinet and the base having a gap therebetween, the base having a flat upper surface comprising a hinge plate and a fixed plate;

a water bowl disposed upon and attached to the upper surface hinge plate portion by a plurality of spring loaded pins which urge the water bowl upward when the water bowl is empty;

the hinge plate having at least one hinge attached to a first edge of the hinge plate, the hinge also attached to the base, the hinge plate being rotatable upon the hinge from a first position in which the water bowl rests upright upon the base to a second position in which the bowl is substantially perpendicular to the first position, the hinge plate having on the upper surface a first switch (N-C) disposed so that when the water bowl is empty, the switch is in a first position, but when the water bowl is not empty the switch is in a second position, the base having a second switch (N-O) disposed so that when the hinged plate is in the first position the switch is in a first position, but when the hinged plate is not in the first position, the switch is in a second position, the base having within itself an electrical motor, the electrical motor driving a threaded axle worm drive, the threaded axle worm drive having riding thereupon and in threaded mechanical engagement thereto a worm gear, the worm gear attached to an arm at a first end of the arm, the arm attached to the hinge plate, the worm gear having a first position upon the worm drive in which the arm is in a first position, whereby the hinged plate rests in the hinged plate's first position and the water bowl rests upright upon the base when the worm gear is in the worm gear's first position, the worm gear having a second position upon the worm drive in which the arm is in a second position, whereby the hinged plate is in the hinged plate's second position when the worm gear is in the worm gear's second position;

a third switch (polarity) which has a first mode in which a current may pass through the switch in a first direction and having a second mode in which the current may pass through the switch in a second direction, the third switch being disposed in a position such that when the worm gear reaches the second position upon the worm drive, the worm gear activates the third switch to change mode, the current from the third switch passing through the electrical motor, whereby when the third switch changes polarity, the electrical motor changes a direction of rotation, whereby the worm gear changes a direction of motion upon the worm drive;

a food dish attached to the fixed plate of the flat upper surface of the base;

a food supply container having a sloping bottom having a food supply aperture therethrough, the food supply aperture having a food supply spring loaded door with open and closed positions, the spring loaded food supply door having a spring which urges the spring loaded food supply door into the closed position, a first solenoid operatively mechanically attached to the spring loaded food supply door to move it to the open position, a portion hopper disposed immediately beneath the food supply aperture and having a first condition characterized by being full of food so that such spring loaded food supply door is blocked; whereby when the first solenoid opens the spring loaded food supply door, food within the food supply container may fall into the portion hopper only until the portion hopper is full;

the portion hopper also having a sloped bottom, the sloped bottom having a portion hopper aperture therethrough; the portion hopper aperture having a portion hopper spring loaded door with open and closed positions, the portion hopper spring loaded door having a spring which urges the portion hopper spring loaded door into the closed position, a second solenoid operatively mechanically attached to the portion hopper spring loaded door to move it to the open position, a food supply conduit with an upper end disposed beneath the portion hopper aperture and a food supply conduit having a lower end disposed in the gap and directly above the food bowl and operative to convey food from the food supply aperture to the food bowl, a water supply container having water therein, the water supply container being attached to a water supply, the water supply container having a float and plug attached to a water supply arm at a first end of the water supply arm, the water supply arm having a second solenoid attached to a second end of the water supply arm, the water supply arm having a first position in which the plug blocks a water supply aperture and a second position in which the plug does not block the water supply aperture, the float operative to maintain the arm in the second position and the plug not blocking the water supply aperture only while a first quantity of water remains within the water supply container, a water supply conduit with an upper end disposed beneath the water supply aperture and a lower end disposed in the gap and directly above the water bowl and operative to convey water from the water supply aperture to the water bowl.

It is therefore another aspect, advantage, objective and embodiment of the invention to provide an animal care device further comprising:

a programmable logic controller in operative electrical communication with the first and second solenoids and switch one and two, the programmable logic controller using switch one to determine when the water bowl is empty and activate the electrical motor, whereby the worm drive, worm gear, arm, and hinged plate cooperate to cause the water bowl to rise into the second position and thus empty.

It is therefore another aspect, advantage, objective and embodiment of the invention to provide an animal care device further wherein:

the activation of switch 3, reversing the direction of the worm gear upon the worm drive, returns the water bowl to the upright position; and further wherein the programmable logic controller, using switch one and two, is operative to determine that the bowl is upright but empty and activate the second solenoid;

whereby fresh water is supplied to the water bowl.

It is therefore another aspect, advantage, objective and embodiment of the invention to provide an animal care device further wherein;

the programmable logic controller is operative at a plurality of predetermined times to activate solenoid one;

whereby fresh food is supplied to the food bowl.

It is therefore another aspect, advantage, objective and embodiment of the invention to provide a pet care device further comprising;

a plurality of spring loaded pins supporting and urging upward the portion control hopper, a fourth switch attached to the portion control hopper, the fourth switch having a first position assumed when the portion control hopper is not full and a second position assumed when the portion control hopper is full;

the fourth switch further being operatively connected to such programmable logic controller.

It is therefore another aspect, advantage, objective and embodiment of the invention to provide a pet care device further comprising;

a relay under the control of the third switch, the third switch changing polarity by activating the relay, the relay having first and second states, the first state allowing current to flow normally, the second state caused by activation of the third switch and causing the current to reverse direction until the current is removed, whereat the relay returns to the first state.

BRIEF DESCRIPTION OF THE DRAWINGS

FIG. 5 is a table showing switches and logic conditions for the water bowl controls, in particular, the switch statuses which are necessary in order to achieve controlled flow of water.

FIG. 6 is a table showing the switches and logic for the water bowl controls, in particular, the switch statuses which are necessary in order to achieve controlled dumping of water.

INDEX TO REFERENCE NUMERALS

Figure 1:
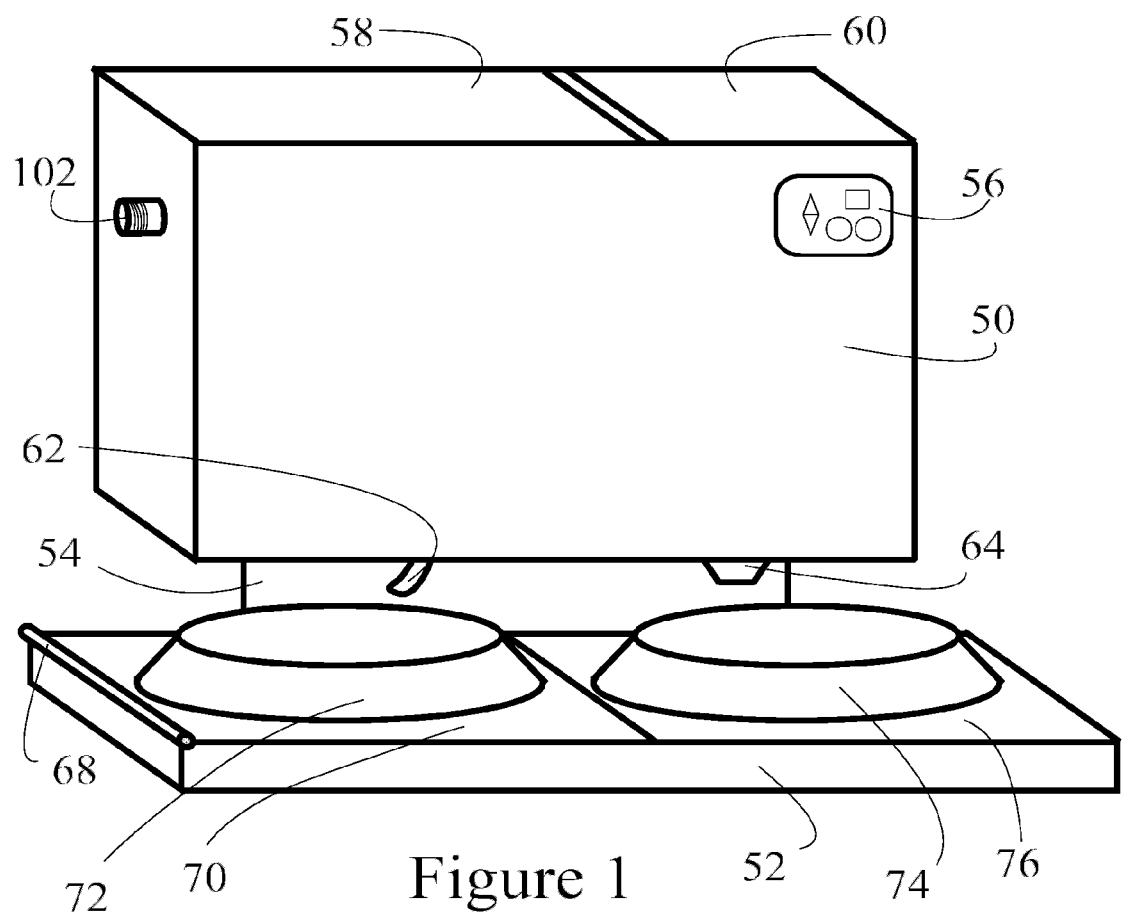
FIG. 1 is an external perspective view of a simplified preferred embodiment of the invention showing the water and food dishes and one overall configuration.

Cabinet 50
Base 52
Support/backplate 54
Controls 56
Water tank access 58
Food supply door 60
Water conduit lower end 62
Food conduit lower end 64
Hinge 68
Hinge plate 70
Water bowl 72
Food bowl 74
Fixed plate 76
Fresh water supply 102
Water tank 104
First solenoid 106
Flapper valve 108
AND gate 110
First solenoid arm 112
Connector 114
Valve seat 116
Water conduit 118
Electrical connection from solenoid one to AND gate 120
Electrical connections to water bowl switches 122
Electrical connection to PLC 124
Float 126
Water supply valve 128
Second solenoid 204
Storage hopper 202
Fourth switch (NO) 206
First pivot 208
Mounting pin 210
Spring 212
Third solenoid 214
Spring loaded door 216
Mounting bracket 218
Portion hopper 220
Mounting bracket 222
Second pivot 224
Sloped food hopper bottom 226
Sloped portion h. bottom 228
Spring loaded portion door 230
Electrical connection from second solenoid to Fourth switch 232
Electrical connection from second solenoid to PLC 234

Electrical connections from
 PLC to both
 water bowl switches 236
Food conduit 240
Hinge 304
Dumping plate 306
Base cover/plate 308
First switch (NC) 310
Second switch (NO) 312
Worm gear 314
Dump motor 316
Programmable Logic
 Controller (PLC) 318
Third switch (Polarity) 320
Fifth switch (End of Cycle) 321
Spring loaded pins 322
Relay 323
Worm drive 324
Stop 326
Return Stop 327
Electrical connection
 from AND gate
 to solenoid 1 328
Electrical connection from
 motor to PLC 330
Electrical connection from
 third switch to motor 332
Electrical connection from
 second switch to
 PLC 334
Arm 338

DETAILED DESCRIPTION

FIG. 1 is an external perspective view of a simplified preferred embodiment of invention showing the water and food dishes and one overall configuration. Cabinet 50 is shown as a fairly conventional rectangular configuration but can be any desirable shape or omitted entirely. Base 52 is disposed beneath cabinet 50 and attached thereto by means of support/backplate 54, however, the relationship of the two is defined by the gap therebetween, not necessarily by the means of connection. For example, the base 52 might rest up on the ground while the cabinet 50 may be attached to a wall, without any supporting connection between the two portions.

In general, the gap between the two parts is of sufficient size so that the water bowl 72 may swing up along with hinge plate 70 to a substantially vertical orientation in which the bowl will empty itself. For example, in this FIG. 1 the cabinet is narrow enough so that the bowl may pass partially in front of the cabinet, but in other configurations the gap may be wider than the bowl's height when on edge.

Controls 56 allow the user to program the times of feeding and dumping of the water bowl.

Water tank access 58 is provided both to allow access to the water tank equipment within the cabinet and also to allow a user to manually fill the water tank when the water supply 102 is not used, or in embodiments which have no water supply 102. In general, water supply 102 may simply be a nipple or the end of a tube, or it may be threaded as shown with a normal male connector or threaded with a normal female connector (thus allowing attachment to a garden hose), or other configurations.

Food supply door 60 allows access to the food supply within cabinet 50 so the user may fill the food supply.

Water conduit lower end 62 is depicted projecting from the lower side of cabinet 50, as is, food conduit lower end 64 however in embodiments these may project from the front face of the cabinet, may be connected to the bowl, etc.

Hinge 68 allows hinge plate 70 to raise up, thus carrying water bowl 72 to the vertical orientation previously mentioned. It will be appreciated that the water bowl 72 has a first position, normally upright, for holding food, when the hinge plate 70 is flat to the base 52. Water bowl 72 also has a partially vertical or perpendicular position, which may be past vertical, prior to vertical, etc, in which the bowl 72 does not hold water.

Food bowl 74 may in embodiments be arranged in a manner similar to water bowl 72, however, in the preferred embodiment it is fixed on fixed plate 76 of base 52 and does not rotate.

Figure 2:
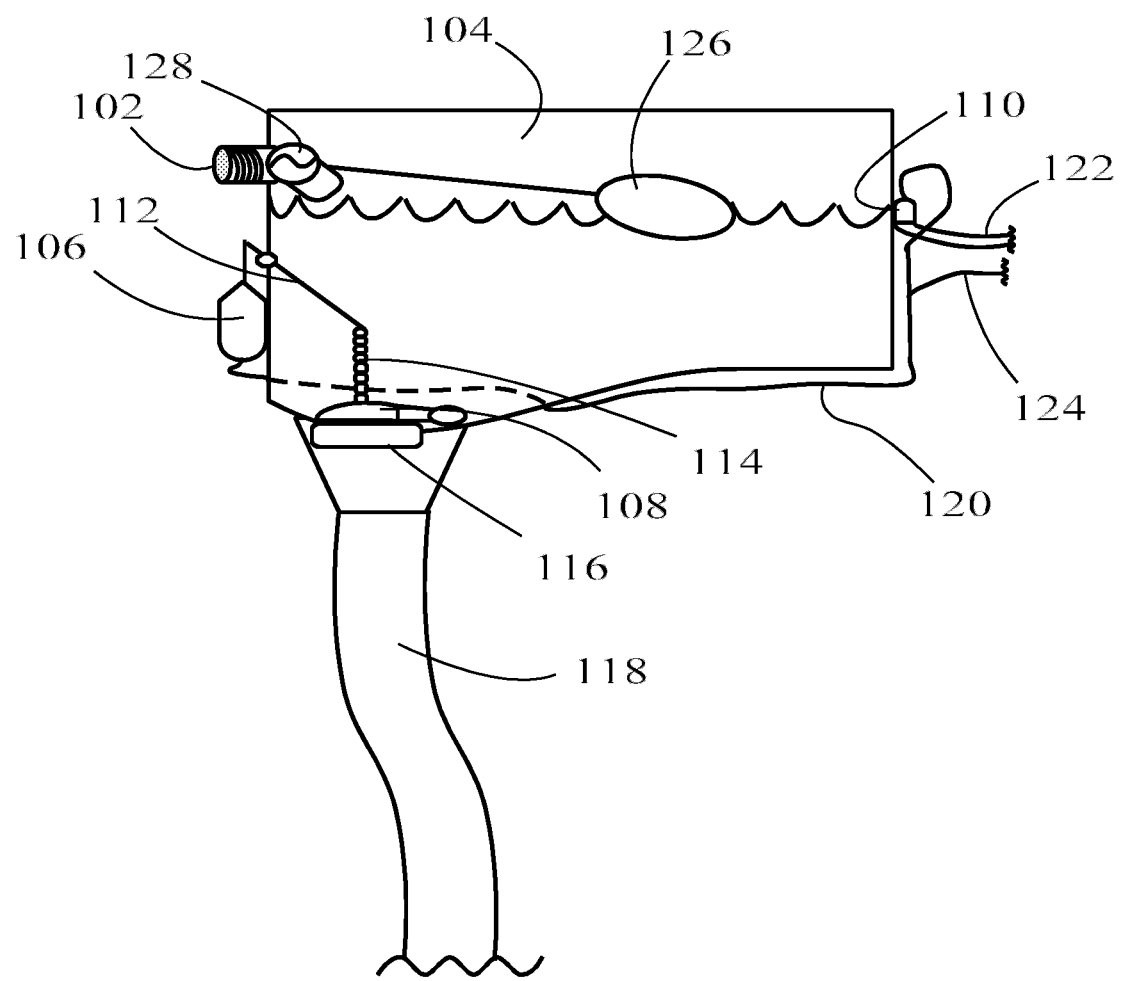
FIG. 2 is a cross-sectional view also showing electronic control components of a water reservoir and delivery system of the invention.

FIG. 2 is a cross-sectional view also showing electronic control components of a water reservoir and delivery system of the invention. In the preferred embodiments, fresh water supply 102 feeds water tank 104 by means of water supply valve 128. Water supply valve 128 provides water to the tank 104 when the water level in the tank is reduced, for example by means of float 126 which operates the water supply valve 128. In a first position, the float actuates the valve to open allowing water in: this would correspond to a reduced water level due to the tank having supplied/supplying water. In a second position, the float closes the valve, this would correspond to the water level being at the desirable level.

First solenoid 106 controls flapper valve 108 by means of first solenoid arm 112, which has connector 114 attached to flapper valve 108. Normally flapper valve 108 sits in valve seat 116, but when pulled upward by an activation of first solenoid 106, the flapper valve opens and water pressure or other design of the valve allow it to remain open until the water level has dropped substantially, which occurs as water pressure forces the water in the tank through valve seat 116 (at the upper end of the conduit) and into water conduit 118 to finally pass through the lower end of the conduit 62 (FIG. 1).

Electronic control of this water supply mechanism consists of AND gate 110 (op-amp) which has an operative electrical connection to solenoid one 120 and another pair of operative electrical connections from water bowl switches (connection 122, switches seen in later diagram). Finally, there is also an operative electrical connection to the programmable logic controller (PLC/PLI) 124.

In use, water is delivered when the two water bowl switches indicate that the bowl is in the normal upright position but light enough (in a raised position) to indicate that it is not full of water.

Figure 3:
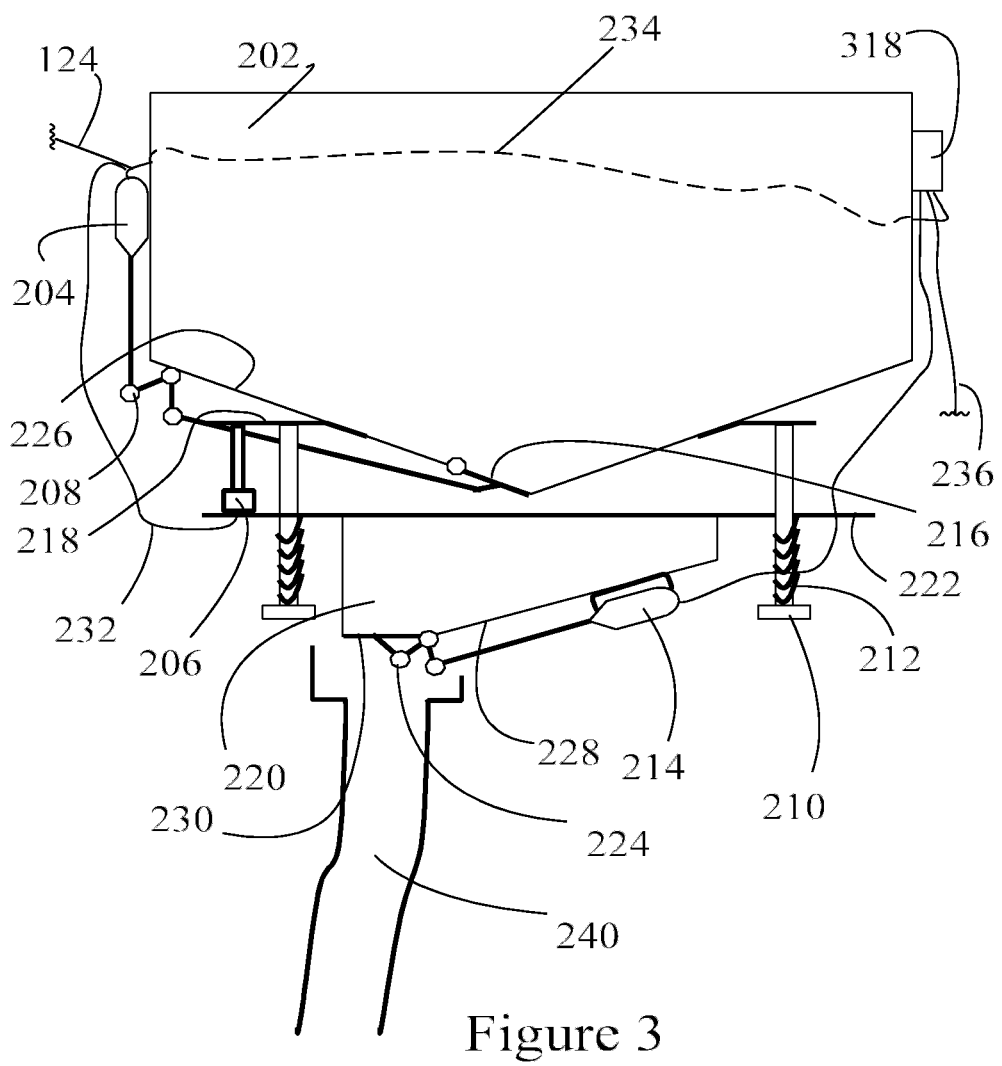
FIG. 3 is a cross-sectional view also showing electronic control components of a food hopper and delivery system of the invention.

FIG. 3 is a cross-sectional view also showing electronic control components of a food hopper and delivery system of the invention.

Second solenoid 204 is disposed close to, or attached on the side of, storage hopper 202 which holds food for the animal. First pivot 208 is of a triangular configuration, with three pivot points, one attached to the fulcrum (shown as the food supply in this case), another on the arm to solenoid 204 and a third pivot point on the arm going toward spring loaded door 216.

Beneath spring loaded door 216, which is normally held closed by its spring-loading despite the weight of food in the food supply hopper, there is disposed portion hopper 220. At least one mounting pin 210 having spring 212 supports the mounting bracket 222 of portion hopper 220. In the preferred embodiments, spring 212 urges the portion hopper into an upward position when empty and allows it to compress spring 212 and go lower when food is therein. Fourth switch 206 (Normally Open or NO) has two positions, one attained when the portion hopper is raised and one when the portion hopper is lowered, as mounting brackets 218 and 222 (or other fixed parts of the mechanism) may cooperate to operate the fourth switch 206.

When the portion hopper has food therein fourth switch 206 is open, with no signal, and a third solenoid 214 may open spring loaded door 230 in a manner similar to the action of solenoid 204 and door 216, again by means of a three sided pivot 224. Note that at most times food in the portion hopper 220 will keep it lowered (SW4 open) and awaiting a signal from PLC 318 to solenoid 214 to dispense the food.

Mounting bracket 218 is the fixed connection for pins 210. Sloped food hopper bottom 226, and sloped portion hopper bottom 228 allow food to roll comfortably downward through the respective spring-loaded doors.

Electrical connection from second solenoid to fourth switch 232 allows the switch 206 to control the solenoid 204, in particular, the switch will cause the solenoid to cease opening the door 216 when the portion hopper is full.

In alternative embodiments, the portion hopper may simply become full and prevent further food from entering via door 216.

PLC 318 may be seen. It may control operation of the device, for example, causing feeding to occur at programmed times, and causing emptying of the water bowl to occur at preprogrammed times. It may also cause feeding or watering "on demand" if the user activates one of controls 56 to do so, or if the animal has been trained to do so.

Electrical connection 234 from second solenoid to PLC 318 allows the PLC to begin operating the solenoid (feed the animal) at programmed times.

Electrical connections 236 from PLC 318 to both water bowl switches allow the PLC to monitor the state of the bowl: upright, tilted, full, not full, empty, etc.

Food conduit 240 has its upper end disposed beneath the portion hopper spring loaded door 230 and its lower end 64 disposed above the food bowl 74.

Figure 4:
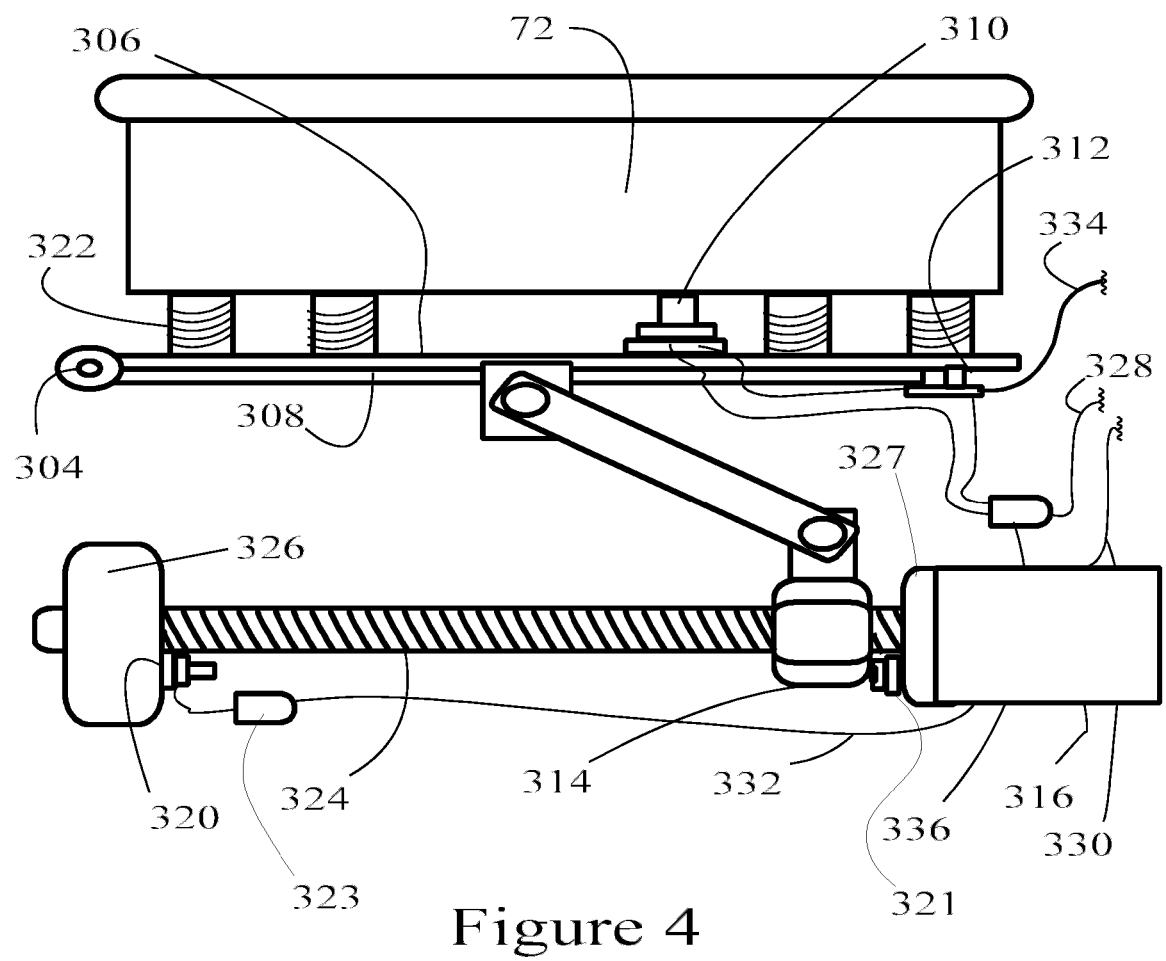
FIG. 4 is a cross-sectional view showing a water dish with cleaning mechanism of the invention, showing in addition the electronic and electro-mechanical components of the system which maintain clean water in the water bowl.

FIG. 4 is a cross-sectional view showing a water dish with cleaning mechanism of the invention, showing in addition the electronic and electro-mechanical components of the system which maintain clean water in the water bowl. Hinge 304 allows dumping plate 306 to lift off of base cover/plate 308 and thus up-end the water bowl 72, emptying it while it is tilted.

First switch (NC) 310 measures the status of the water in the bowl: when the bowl is full, the switch 310 will be in a first position but when the bowl is not full, the switch 310 will be in a second position. Similarly, second switch (NO) 312 monitors the hinge plate 306, thus when the hinge plate 306 is tilted upward, the second switch will over-ride the first switches indication that the bowl is seemingly empty.

Worm gear 314 rides upon worm drive 324 and is thus propelled along the drive by the direction of rotation of dump motor 316. Programmable Logic Controller (PLC) 318 may thus set dump motor 316 into operation at a given time, causing the worm gear 314 to move toward the far distal end of the worm drive 324, which pushes arm 336, attached to hinge plate 316 (and not to cover plate 308). Arm 336 then lifts hinge plate 316. However, when worm gear 314 activates polarity switch (third switch) 320 mounted upon stop 326 at which third switch 320 signals relay 323 to reverse the current flow to motor 316, causing the motor to reverse direction, worm gear 314 to retreat back toward motor 316 and the hinge plate 316 to return to the horizontal position. Relay 323 has first and second states: in the first (normal) state current flows so as to drive worm gear 314 toward stop 326 and dump the bowl 72, while in the second state current flows so as to drive worm gear 314 toward return stop 327. At the end of the travel of worm gear 314, it will close switch 321, signaling the end of the cycle, the termination of current will deactivate relay 323, and thus at the beginning of the next cycle current will once again flow so as to dump out the bowl 72.

Spring loaded pins 322 urge the bowl 72 upward when it is not full or optionally when it is empty, but allow it to drop and alter the position of switch 310 when it is full or optionally, when it is not empty.

Electrical connection from AND gate to solenoid one 328, electrical connection from motor to PLC 330, electrical connection from third switch to motor 332 and electrical connection from second switch to PLC 334 allow the PLC and switches to control operation of the hinge plate/dump motor/etc.

FIG. 5 is a table showing switches and logic conditions for the water bowl controls, in particular, the switch statuses which are necessary in order to achieve controlled flow of water.

FIG. 6 is a table showing the switches and logic for the water bowl controls, in particular, the switch statuses which are necessary in order to achieve controlled dumping of water.

The disclosure is provided to allow practice of the invention by those skilled in the art without undue experimentation, including the best mode presently contemplated and the presently preferred embodiment. Nothing in this disclosure is to be taken to limit the scope of the invention, which is susceptible to numerous alterations, equivalents and substitutions without departing from the scope and spirit of the invention. The scope of the invention is to be understood from the appended claims.

What is claimed is:

1. An animal care device comprising:
a cabinet and a base disposed below the cabinet, the cabinet and the base having a gap therebetween, the base having a flat upper surface comprising a hinge plate and a fixed plate;
a water bowl disposed upon and attached to the flat upper surface of the hinge plate by a plurality of spring loaded pins which urge the water bowl upward when the water bowl is empty;
the hinge plate having at least one hinge attached to a first edge of the hinge plate, the at least one hinge also attached to the base, the hinge plate being rotatable upon the at least one hinge from a first position in which the water bowl rests upright upon the base to a second position in which the bowl is substantially perpendicular to the first position,
the hinge plate having on the upper surface a first switch (N-C) disposed so that when the water bowl is empty, the first switch is in a first position, but when the water bowl is not empty the first switch is in a second position,
the base having a second switch (N-O) disposed so that when the hinged plate is in the first position the second switch is in a first position, but when the hinged plate is not in the first position, the second switch is in a second position,
the base having within itself an electrical motor, the electrical motor driving a threaded axle worm drive, the threaded axle worm drive having riding thereupon and in threaded mechanical engagement thereto a worm gear, the worm gear attached to an arm at a first end of the arm, the arm attached to the hinge plate,
the worm gear having a first position upon the worm drive in which the arm is in a first position, whereby the hinged plate rests in the hinged plate's first position and the water bowl rests upright upon the base when the worm gear is in the worm gear's first position, the worm gear having a second position upon the worm drive in which the arm is in a second position, whereby the hinged plate is in the hinged plate's second position when the worm gear is in the worm gear's second position;

a third switch (polarity) which has a first mode in which a current may pass through the third switch in a first direction and having a second mode in which the current may pass through the third switch in a second direction, the third switch being disposed in a position such that when the worm gear reaches the worm gear's second position upon the worm drive, the worm gear activates the third switch to change mode, the current from the third switch passing through the electrical motor, whereby when the third switch changes polarity, the electrical motor changes a direction of rotation, whereby the worm gear changes a direction of motion upon the worm drive;

a food dish attached to the fixed plate of the flat upper surface of the base;

a food supply container having a sloping bottom having a food supply aperture therethrough, the food supply aperture having a food supply spring loaded door with open and closed positions, the spring loaded food supply door having a spring which urges the spring loaded food supply door into the closed position, a first solenoid operatively mechanically attached to the spring loaded food supply door to move it to the open position, a portion hopper disposed immediately beneath the food supply aperture and having a first condition characterized by being full of food so that such spring loaded food supply door is blocked; whereby when the first solenoid opens the spring loaded food supply door, food within the food supply container may fall into the portion hopper only until the portion hopper is full;

the portion hopper also having a sloped bottom, the sloped bottom having a portion hopper aperture therethrough; the portion hopper aperture having a portion hopper spring loaded door with open and closed positions, the portion hopper spring loaded door having a spring which urges the portion hopper spring loaded door into the closed position, a second solenoid operatively mechanically attached to the portion hopper spring loaded door to move it to the open position, a food supply conduit with an upper end disposed beneath the portion hopper aperture and the food supply conduit having a lower end disposed in the gap and directly above the food bowl and operative to convey food from the food supply aperture to the food bowl, a water supply container having water therein, the water supply container being attached to a water supply, the water supply container having a float and plug attached to a water supply arm at a first end of the water supply arm, the water supply arm having a solenoid attached to a second end of the water supply arm, the water supply arm having a first position in which the plug blocks a water supply aperture and a second position in which the plug does not block the water supply aperture, the float operative to maintain the arm in the second position and the plug not blocking the water supply aperture only while a first quantity of water remains within the water supply container, a water supply conduit with an upper end disposed beneath the water supply aperture and a lower end disposed in the gap and directly above the water bowl and operative to convey water from the water supply aperture to the water bowl.

2. The animal care device of claim 1, further comprising:

a programmable logic controller in operative electrical communication with the first switch and the second switch, the programmable logic controller using the first switch to determine when the water bowl is empty and activate the electrical motor, whereby the worm drive, worm gear, arm, and hinged plate cooperate to cause the water bowl to rise into the second position and thus empty.

3. The animal care device of claim 2, further wherein:

the activation of the third switch, reversing the direction of the worm gear upon the worm drive, returns the water bowl to the upright position; and further wherein the programmable logic controller, using the first switch and the second switch, is operative to determine that the bowl is upright but empty and activate the solenoid of the water supply arm;

whereby fresh water is supplied to the water bowl.

4. The animal care device of claim 3, further wherein;

the programmable logic controller in operative electrical communication with the first solenoid and the second solenoid, and operative at a plurality of predetermined times to active the first solenoid;

whereby fresh food is supplied to the food bowl.

5. The animal care device of claim 4, further comprising:

a relay under the control of the third switch, the third switch changing polarity by activating the relay, the relay having first and second states, the first state allowing current to flow normally, the second state caused by activation of the third switch and causing the current to reverse direction until the current is removed, whereat the relay returns to the first state.

* * * * *